(12) United States Patent
Xu et al.

(10) Patent No.: US 11,127,142 B2
(45) Date of Patent: Sep. 21, 2021

(54) VEHICLE TRAJECTORY PREDICTION MODEL WITH SEMANTIC MAP AND LSTM

(71) Applicant: Baidu USA LLC, Sunnyvale, CA (US)

(72) Inventors: Kecheng Xu, Sunnyvale, CA (US);
Hongyi Sun, Sunnyvale, CA (US);
Jiacheng Pan, Sunnyvale, CA (US);
Xiangquan Xiao, Sunnyvale, CA (US);
Jiangtao Hu, Sunnyvale, CA (US);
Jinghao Miao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 67 days.

(21) Appl. No.: 16/732,125

(22) Filed: Dec. 31, 2019

(65) Prior Publication Data

US 2021/0201504 A1    Jul. 1, 2021

(51) Int. Cl.
| | | |
|---|---|---|
| *G06K 9/00* | (2006.01) | |
| *G06T 7/246* | (2017.01) | |
| *G06K 9/62* | (2006.01) | |
| *G06N 3/08* | (2006.01) | |
| *G05D 1/00* | (2006.01) | |
| *G05D 1/02* | (2020.01) | |
| *H04L 29/08* | (2006.01) | |

(52) U.S. Cl.
CPC .......... *G06T 7/246* (2017.01); *G05D 1/0088* (2013.01); *G05D 1/0214* (2013.01); *G05D 1/0221* (2013.01); *G06K 9/00805* (2013.01); *G06K 9/6262* (2013.01); *G06N 3/08* (2013.01); *G05D 2201/0213* (2013.01); *G06T 2207/20081* (2013.01); *G06T 2207/20084* (2013.01); *G06T 2207/30241* (2013.01); *G06T 2207/30261* (2013.01); *H04L 67/12* (2013.01)

(58) Field of Classification Search
CPC .......... G06T 7/246; G06T 2207/30241; G06T 2207/20084; G06T 2207/30261; G06T 2207/20081; G05D 1/0088; G05D 1/0214; G05D 1/0221; G05D 2201/0213; G06K 9/6262; G06K 9/00805; G06N 3/08; H04L 67/12
USPC .......................................................... 382/103
See application file for complete search history.

(56) References Cited

U.S. PATENT DOCUMENTS

| | | | |
|---|---|---|---|
| 2019/0258251 A1* | 8/2019 | Ditty | .................. G06K 9/00805 |
| 2021/0056324 A1* | 2/2021 | Chen | .................. G06K 9/00805 |

* cited by examiner

*Primary Examiner* — Charlotte M Baker
(74) *Attorney, Agent, or Firm* — Womble Bond Dickinson (US) LLP

(57) ABSTRACT

A system and method for predicting the near-term trajectory of a moving obstacle sensed by an autonomous driving vehicle (ADV) is disclosed. The method applies neural networks such as a LSTM model to learn dynamic features of the moving obstacle's motion based on its past trajectory up to its current position and a CNN model to learn the semantic map features of the driving environment in a portion of an image map. From the learned dynamic features of the moving obstacle and the learned semantic map features of the environment, the method applies a neural network to iteratively predict the moving obstacle's positions for successive time points of a prediction interval. To predict the moving obstacle's position at the next time point from the currently predicted position, the methods may update the learned dynamic features of the moving obstacle based on its past trajectory up to the currently predicted position.

20 Claims, 9 Drawing Sheets

VEHICLE TRAJECTORY PREDICTION MODEL WITH SEMANTIC MAP AND LSTM

TECHNICAL FIELD

Embodiments of the present disclosure relate generally to operating autonomous vehicles. More particularly, embodiments of the disclosure relate to methods for predicting trajectories of obstacles such as other vehicles around an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicles can navigate to various locations using onboard sensors, allowing the vehicles to travel with minimal human interaction or in some cases without any passengers.

Motion planning and control are critical operations in autonomous driving. The safety, accuracy and efficiency of motion planning and control operations depend on the ability of the ADVs to sense and predict the motions of moving obstacles such as other vehicles or pedestrians. Sensors such as cameras, light detection and range (LIDAR) units, radars, etc., are used to capture video and electromagnetic images of environments around the vehicles. The ADVs may process information captured by the sensors to perceive driving environment including obstacles, traffic elements and road features surrounding the ADVs for planning and controlling the motions of the ADVs.

To predict the motions or trajectories of nearby vehicles to allow safe navigation of an ADV, the ADV may predict a vehicle's behavior using a neural network and then use a rule-based method to predict the trajectory of the vehicle. For example, if a vehicle slows down on a left lane before reaching an intersection, it's highly probable that the vehicle will make a left turn at the intersection. The vehicle may be predicted to enter a left turn lane. Using the rule-based method, the vehicle may be predicted to make a left turn at the intersection and to follow a trajectory into a lane of an intersecting street. However, a trajectory prediction model that uses behavior modeling followed by a rule-based method has limitations. In some scenarios, the predicted trajectory from the rule-based method may not be reasonable or optimal. In other situations, there may not be enough scenario information to model the rule-based method with sufficient accuracy. It is desirable to have a vehicle trajectory prediction model that is more accurate, efficient, and robust for safer motion planning and control of ADVs.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
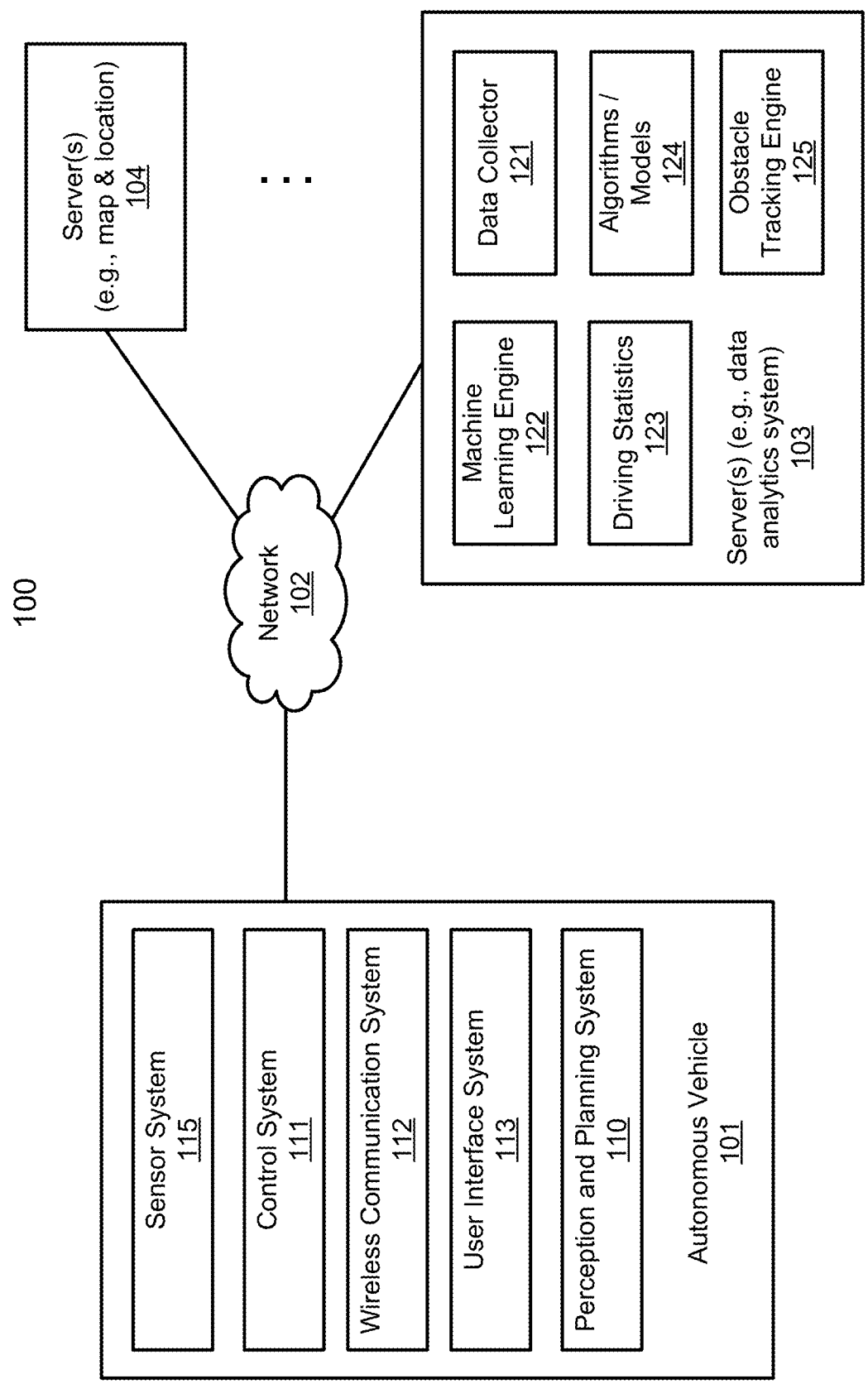
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Predictions of trajectories of moving obstacles, such as moving vehicles or pedestrians around an ADV, are critical for motion planning and control of the ADV. To predict the near-term future trajectory of a moving obstacle, the ADV may consider the past trajectory or history of the motion obstacle in addition to traffic elements, such as traffic signals and traffic pattern, and road features of the environment. Disclosed are methods to predict the near-term future trajectory of a moving obstacle in the vicinity of an ADV by applying neural networks to learn dynamic features of the moving obstacle's motion based on its past trajectory up to its current position and to learn the semantic map features of the environment.

From the learned dynamic features of the moving obstacle and the learned semantic map features of the environment, the methods may further apply a neural network to iteratively predict the moving obstacle's positions for successive time points of a prediction interval. For example, to predict the moving obstacle's position at the next time point from the currently predicted position, the methods may update the learned dynamic features of the moving obstacle based on its past actual trajectory up to the currently predicted position. The neural network may then operate on the updated dynamic features and the semantic map features of the environment to predict the position at the next time point.

In one embodiment, the methods may apply a recurrent neural network (RNN) such as one based on the long short-term memory (LSTM) model to extract and learn the dynamic features of a target obstacle based on its actual past trajectory and any predicted positions in the prediction interval up to the currently predicted position. To extract and learn the semantic map features of the environment around the target obstacle, the methods may apply a convolutional neural network (CNN) to a sub-area of an image map. A feedforward neural network or multi-layer perceptron (MLP) may operate on the dynamic features of the target obstacle generated by the LSTM and the semantic map features generated by the CNN to predict the target obstacle's position for the next time point.

The methods may select moving obstacles of interest in an image map generated from data captured by the sensors of an ADV and may identify a sub-area of the image map around each selected obstacle to extract the semantic map features of the environment used in the prediction model. An image map may show the current positions and the headings of a number of moving obstacles in the vicinity of the ADV. To select a target obstacle to predict its near-term trajectory, a preparatory process may select one of the moving obstacles as the target obstacle. Based on the current position and the current heading of the selected target obstacle, the preparatory process may rotate the image map to position the target obstacle at a reference position and to orient the target obstacle toward a reference heading from the reference position. The preparatory process may crop the rotated image map with respect to the reference point and reference heading to select a sub-area or a sub-image of the image map.

The sub-area may be large enough to encompass a predicted trajectory of the target obstacle for the duration of the prediction interval. The sub-area may be provided as input to a CNN of a trajectory prediction process for the CNN to extract and learn the semantic map features of the environment in the sub-area around the target obstacle. The current position and heading of the target obstacle may be provided as input to an LSTM model of the trajectory prediction process for the LSTM model to extract and learn the dynamic features of the target obstacle. The preparatory process may select successive moving obstacles in the image map as the target obstacle and may identify a sub-area of the image map with respect to each selected target obstacle as inputs to the trajectory prediction process.

The trajectory prediction process may process the current position and heading of the target obstacle through an embedding layer to generate a low-dimensional vector representation of the target obstacle's features at the current time for the LSTM model. The LSTM model may process the low-dimensional vector representation of the target obstacle's features at the current time and the target obstacle's features from its past trajectory or from a previous time to extract and learn the dynamic features of the target obstacle. The output from the LSTM model may be a high-dimensional vector that represents the dynamic features of the target obstacle up to the current time.

The CNN may process the identified sub-area of the image map surrounding the target obstacle to learn and extract the semantic map features of the environment such as other vehicle, traffic elements, and road features. The trajectory prediction process may use a fully connected neural network (NN) layer such as an MLP to process the dynamic features of the target obstacle from the LSTM and the semantic map features from the CNN to predict the positions at a number of time points within the prediction interval. In one embodiment, the prediction interval may be 3 seconds to encompass 30 time points of predicted positions spaced at 0.1 sec apart. For example, the MLP may generate the predicted position of the target obstacle at the first time point of 0.1 sec from the dynamic features of the target obstacle up to the current time and the semantic map features.

To generate the predicted position of the target obstacle at the next time point of 0.2 sec, the trajectory prediction process may process the predicted position of the target obstacle at the first time point of 0.1 sec through an embedding layer to generate the low-dimensional vector representation of the target obstacle's features at the first time point. The LSTM model may then process the low-dimensional vector representation of the target obstacle's features at the first time point to update the dynamic features of the target obstacle. The output from the LSTM model may be an updated high-dimensional vector that represents the dynamic features of the target obstacle up to the first time point of the prediction interval. The MLP may generate the predicted position of the target obstacle at the second time point of 0.2 sec from the dynamic features of the target obstacle up to the first time point and the semantic map features.

To predict the position of the target obstacle at additional time points, the trajectory prediction process may thus iteratively process the predicted position of the target obstacle at the latest time point through an embedding layer to generate a low-dimensional vector representation, process the low-dimensional vector representation through the LSTM model to update the high-dimensional vector that represents the dynamic features of the target obstacle up to the latest time point, and process the dynamic features of the target obstacle up to the latest time point and the semantic map features through the MLP to generate the predicted position of the target obstacle at the next time point. The trajectory prediction process may generate the predicted positions of the target obstacle for all time points of the prediction interval. Using a combination of the LSTM to extract and learn the dynamic features of the target obstacle, the CNN to extract and learn the semantic map features of the environment around the target obstacle, and the MLP to predict the positions of the target obstacle based on the dynamic features of the target obstacle and the semantic map features of the environment provides a more accurate, efficient, and robust prediction of the target obstacle's trajectory than using a rule-based method.

According to one embodiment, a method is disclosed for selecting a target obstacle and a sub-map from an image map generated from data captured by the sensor system of an ADV for use in predicting the trajectory of the selected target obstacle in the selected sub-map. The method includes receiving an image map showing obstacles such as vehicles detected by the ADV during a planning cycle. The method includes selecting one of the detected vehicles as the target obstacle. The method also includes rotating the image map to position the target obstacle at a reference position and in a reference heading in the rotated image map. The method further includes cropping the rotated image map with respect to the target obstacle positioned at the reference position and in the reference heading to generate the sub-map.

According to one embodiment, a method is disclosed for using neural networks to learn the dynamic history of a target obstacle detected by an ADV and the semantic map features of the environment around the target obstacle and to use the learned information of the target obstacle and the environment to predict the trajectory of the target obstacle. The method includes receiving an image map of the driving environment around the target obstacle. The target obstacle includes information on features of the target obstacle. The method includes using a first NN to process the image map to learn the semantic map features of the environment. The method also includes embedding the features of the target obstacle into a low-dimensional vector. The method further includes using a second NN to process the low-dimensional vector and the most recent dynamic features of the target obstacle to learn updated dynamic features of the target obstacle.

The method further includes using a third NN to process the updated dynamic features of the target obstacle from the second NN and the semantic map features of the environment from the first NN to generate a predicted position of the target obstacle. To predict additional positions of the target obstacle, the method further includes iteratively embedding features of the latest predicted position of the target obstacle into a low-dimensional vector, using the second NN to process the low-dimensional vector to update the dynamic features of the target obstacle based on the features of the latest predicted position, and using the third NN to process the updated dynamic features of the target obstacle and the semantic map features to generate the next predicted position of the target obstacle.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc. In one embodiment, autonomous vehicle 101 may download HD maps from servers 103 or 104 for use in motion planning and control.

An autonomous vehicle refers to a vehicle that can be configured in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
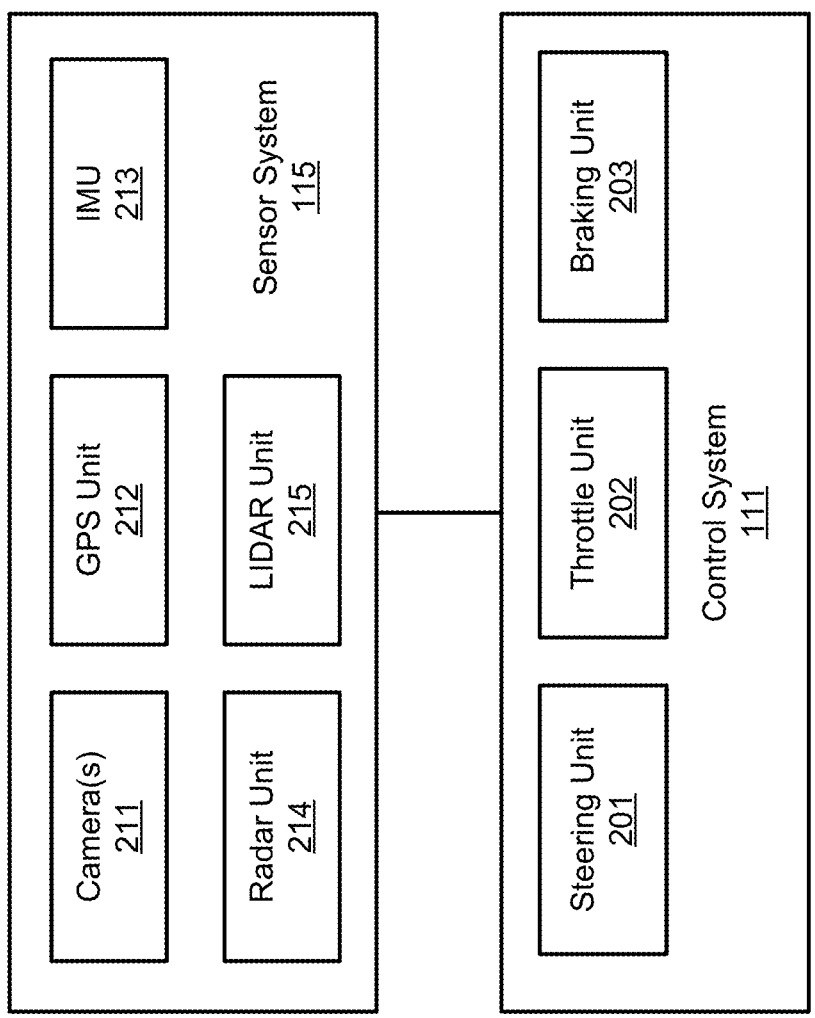
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GP S system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor senses the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110. In one embodiment, the location and MPOI information may be obtained from HD maps downloaded from servers 103-104.

While autonomous vehicle 101 is moving along the route, perception and planning system 110 may also obtain real-time traffic information from a traffic information system or server (TIS). Note that servers 103-104 may be operated by a third party entity, such as a service provider that downloads a starting position and a destination position to perception and planning system 110 for perception and planning system 110 to plan a route. The third party may also issue commands to perception and planning system 110 to command autonomous vehicle 101 to start traveling on the planned route. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc. Driving statistics 123 may further include poses captured by IMU and GPS sensors describing a position and orientation of the vehicles.

Based on driving statistics 123, machine learning engine 122 generates or trains a set of rules, algorithms, and/or predictive models 124 for a variety of purposes. In one embodiment, algorithms 124 may include deep learning neural network models used to predict the trajectories of other vehicles in the environment of autonomous vehicle 101 to enable perception and planning system 110 to navigate autonomous vehicle 101 to avoid colliding with the other vehicles.

Algorithms 124 may be uploaded on ADVs to be utilized during autonomous driving in real-time or may be utilized by other modules such as obstacle tracking engine 125 of server 103. In one embodiment, obstacle tracking engine 125 can predict the near-term motions or trajectories of moving obstacles such as vehicles or pedestrians surrounding autonomous vehicle 101 based on the past trajectories of the moving obstacles and the environment in which the moving obstacles operate. Although obstacle tracking engine 125 is shown as part of server 103, in some embodiments, engine 125 may be part of server 104.

Figure 3A:
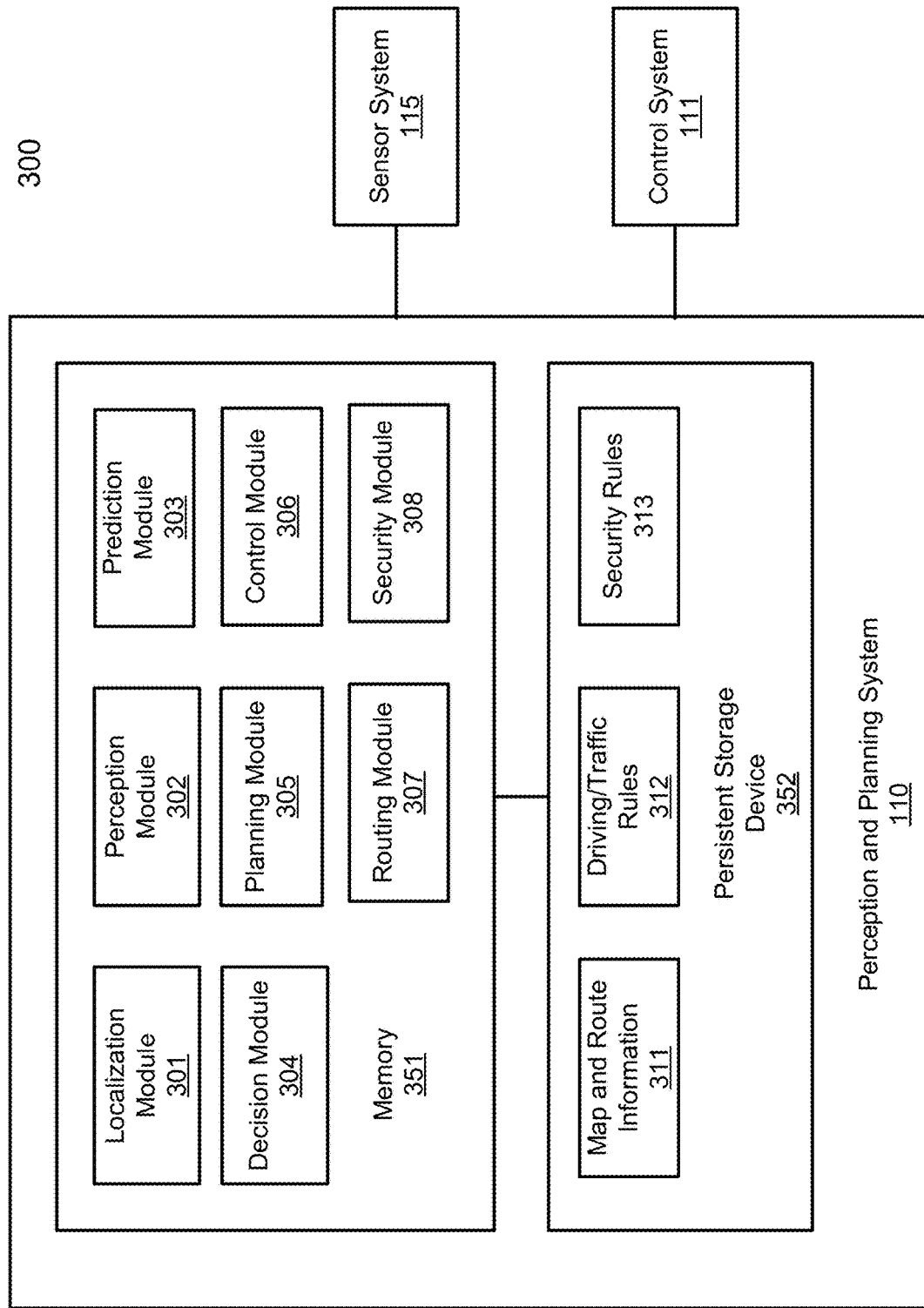
FIGS. 3A-3B are block diagrams illustrating an example of a perception and planning system used with an autonomous vehicle according to one embodiment.
Figure 3B:
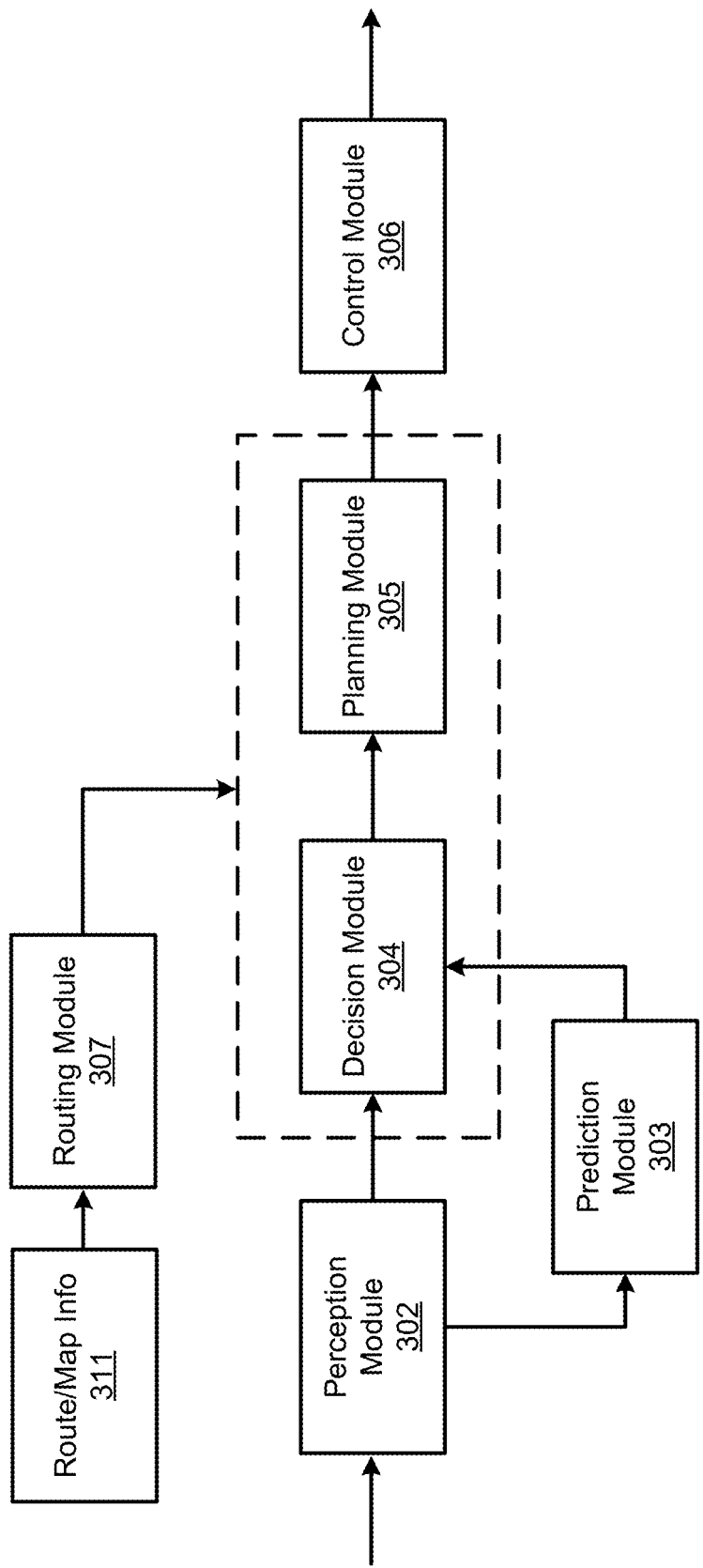

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and security module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, decision module 304 and planning module 305 may be integrated as a single module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. In one embodiment, the map and route information 311 may be HD maps. The HD maps may be downloaded from the location server and the MPOI server. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle 101. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR. In one embodiment, perception module 302 may generate an image map that shows the current positions, current headings, and past trajectories of other vehicles or pedestrians in the environment of autonomous vehicle 101.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

Prediction module 303 may predict the future trajectory of the vehicle by applying neural networks to learn dynamic features of the vehicle's motion based on its past trajectory and to learn the semantic map features of the driving environment from the image map provided by perception module 302. From the learned dynamic features of the vehicle and the learned semantic map features of the environment, prediction module 303 may further apply a neural network to iteratively predict the vehicle's positions for successive time points of a prediction interval. In one embodiment, the prediction module 303 is run for every planning cycle, also referred to as a prediction cycle, of 100 milliseconds (ms). For each of the planning cycles, prediction module 303 predicts the vehicle's positions for the next prediction interval, such as 3 seconds at periodic time points within the prediction interval. In one embodiment, the periodic time points have a period of 100 ms. For example, at every 100 ms prediction interval, prediction module 303 may predict the vehicle's positions for the next 3 seconds encompassing 30 periodic time points spaced at 100 ms apart.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Thus, based on a decision for each of the objects perceived, decision module 304 and/or planning module 305 plans a path or route for the autonomous vehicle, as well as driving parameters (e.g., distance, speed, and/or turning angle), using the reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect pedestrians, vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

In one embodiment, security module 308 is configured to detect cyber and spoof attacks based on a set of security rules 313. Security module 308 may be implemented as a part of perception module 302 or may communicate with perception module 302 or other modules. Security module 308 may detect changes to the autonomous vehicle's destination or abnormal re-routing activities to determine if there is a cyber-attack. Security module 308 may also detect spoofing on the autonomous vehicle's sensor system 115 to foil spoofing attacks. In one embodiment, security module 308 may inform the decision module 304 of the attacks so the autonomous vehicle may be switched to a fail-safe operation.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
FIG. 4 is a block diagram illustrating an architecture of an autonomous driving system according to one embodiment.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5:
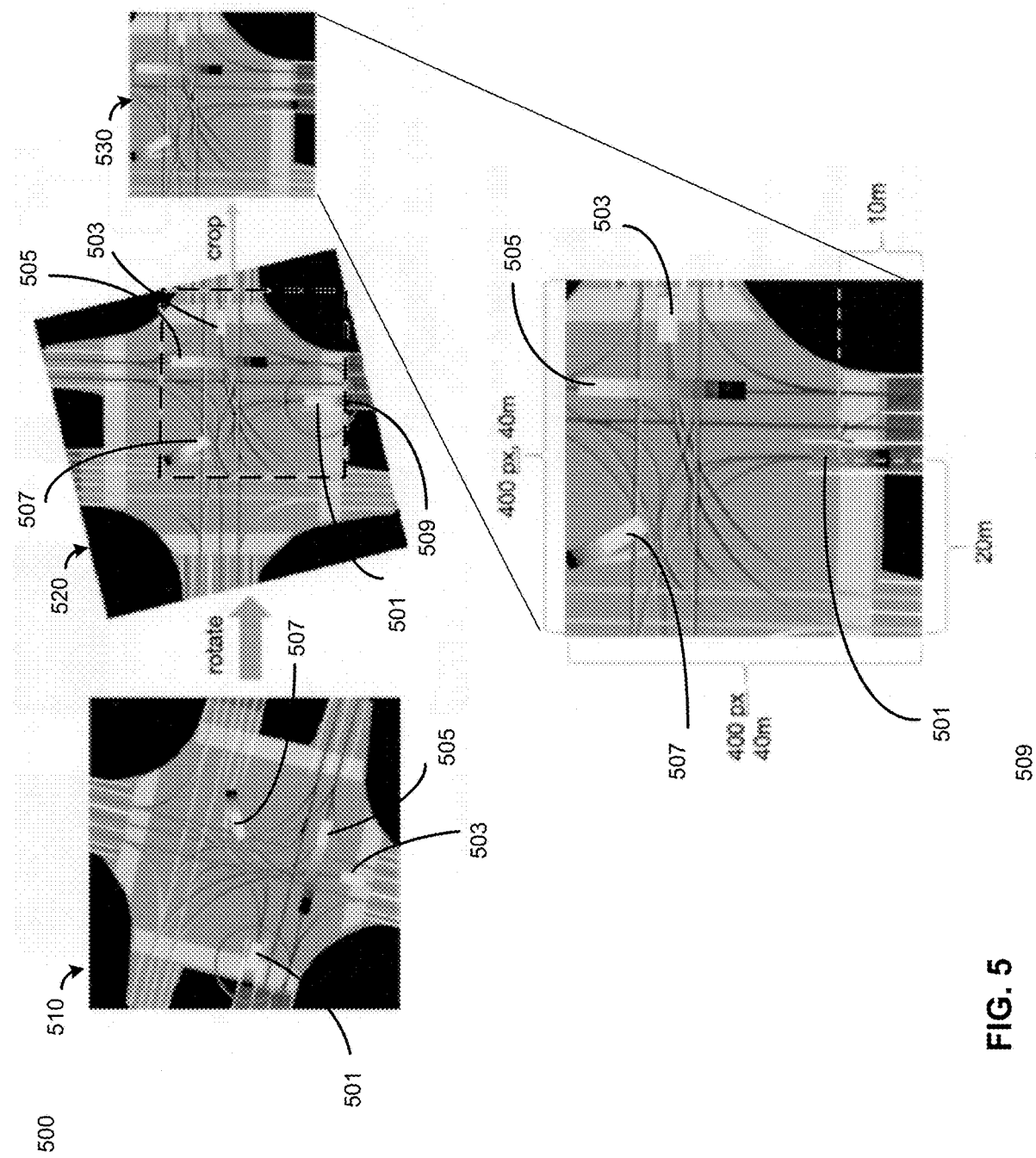
FIG. 5 is a diagram illustrating a process to select a target obstacle and a sub-map of an image map for trajectory prediction of the selected target obstacle based on features of the sub-map according to one embodiment.

FIG. 5 is a diagram illustrating a process 500 to select a target obstacle and a sub-map of an image map for predicting a trajectory of the selected target obstacle based on features of the sub-map according to one embodiment. The image map may be generated by perception module 302 or prediction module 303 from data captured by sensor system 115 of autonomous vehicle 101 to identify a sub-area of the image map around each selected obstacle to extract the semantic map features of the driving environment.

In one embodiment, perception module 302 may generate an image map that shows the current positions, current headings, and past trajectories of other vehicles or pedestrians in the environment of autonomous vehicle 101. For example, image map 510 shows four vehicles 501, 503, 505, and 507 near an intersection. The lines show the lanes of the roads that intersect at the intersection and the possible routes that may be taken by vehicles entering the intersection. The current position of a vehicle may be denoted by the white rectangle while the progressively darker area trailing the white rectangle denotes its past trajectory. The current heading of the vehicle may be denoted by the lane occupied by the vehicle. For example, vehicle 501 is shown entering the intersection from the left to either make a left turn or a U-turn; vehicle 503 is shown entering from the bottom to make a left turn; vehicle 505 is shown crossing the intersection in a straight heading from left to right; vehicle 507 is shown entering the intersection from the right to make a left turn.

Perception module 302 may select one of the vehicles, referred to as a target obstacle, for predicting its trajectory. To select the sub-area of the image map relevant to the selected target, perception module 302 may rotate the image map to position and orient the target obstacle at a reference position in a reference heading. For example, vehicle 501 may be selected as the target obstacle. To select the sub-area of the image map around vehicle 501, image map 510 may be rotated counter-clockwise so that vehicle 501 is at a reference position near the center bottom of the rotated image map and heading in a northerly direction as shown in rotated image map 520. The rotated image map may be cropped with respect to the target obstacle to reduce the amount of semantic map features to be extracted from the environment relevant to the target obstacle. For example, rotated image map 520 may be cropped as defined by boundary 509 to generate sub-map 530. The size of a sub-map may be large enough to envelope a predicted trajectory of the target obstacle for the duration of the prediction interval. In one embodiment, the prediction interval may be 3 seconds and sub-map 530 may be a 40 m×40 m square (400 pixels×400 pixels at a pixel spacing of 0.1 m) with the reference position for the target obstacle, vehicle 501, located at the mid-point in the x-axis and 10 m up in the y-axis of sub-map 530.

From the perspective of sub-map 530 as shown, vehicle 501 as the target vehicle is at the reference position traveling north on a left turn lane as it enters the intersection; vehicle 503 is entering the intersection from the east also on a left turn lane; vehicle 505 is traveling north through the intersection; and vehicle 507 is making a left turn through the intersection traveling south in the opposite direction to vehicle 501. Sub-map 530 may be used by a CNN to extract and learn the semantic map features of the environment in sub-map 530 through which vehicle 501 is expected to travel. The current position, heading, and other metadata (e.g., a speed, turning angle) of vehicle 501 may be used by an LSTM model to extract and learn the dynamic feature of vehicle 501. Perception module 302 may successively select vehicles 501, 503, 505, and 507 in image map 510 as the target vehicle for every prediction cycle or planning cycle, and rotate and crop the image map with respect to the selected target vehicle to generate a corresponding sub-map for use by NN models to predict the trajectory of the selected target vehicle through the driving environment of the sub-map. In one embodiment, the planning cycle may be 0.1 second.

Figure 6:
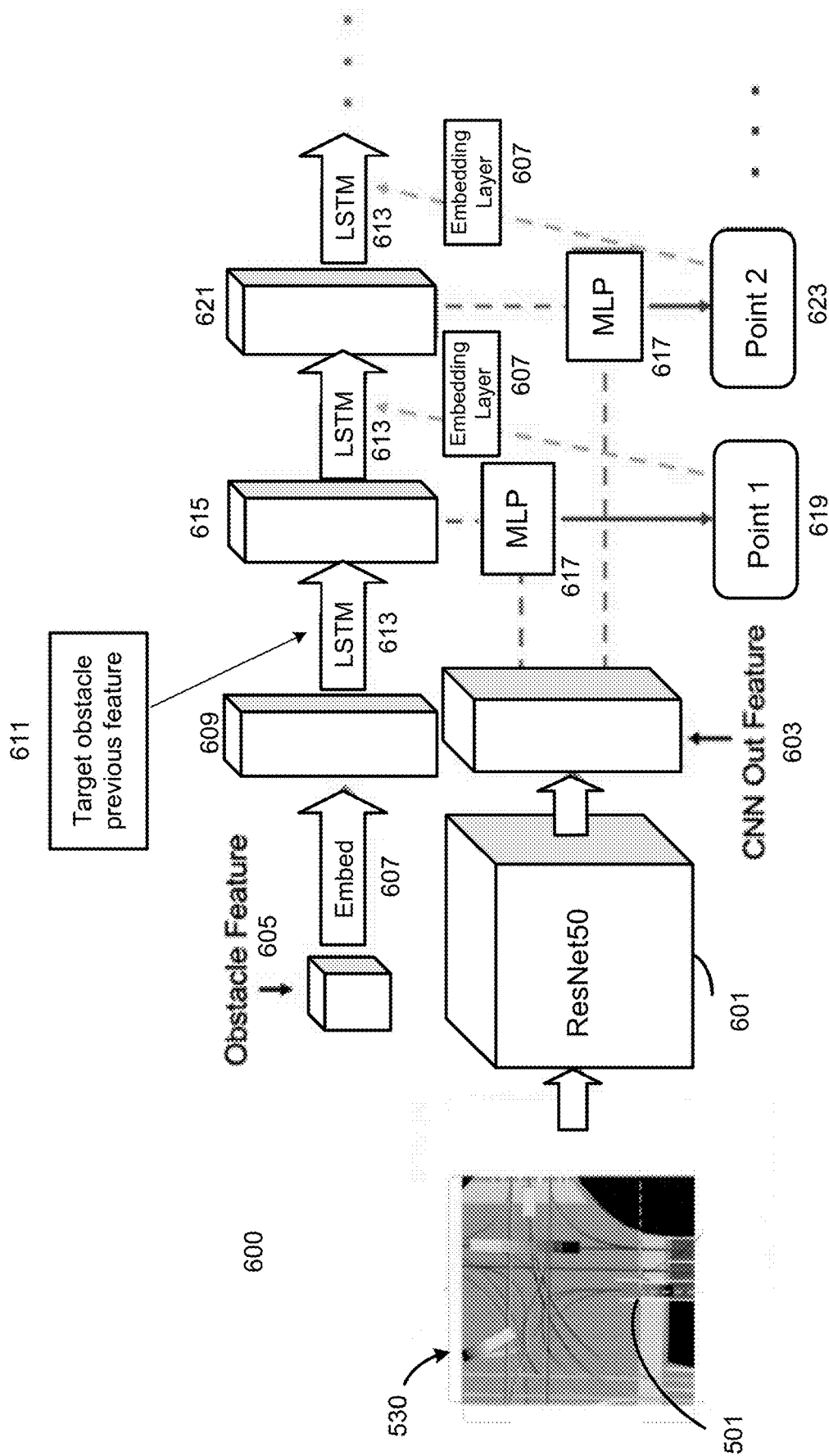
FIG. 6 is a diagram illustrating a process for deploying neural network models to predict the trajectory of a target obstacle using learned semantic map features of the environment and learned dynamic history of the target obstacle according to one embodiment.

FIG. 6 is a diagram illustrating a process 600 for deploying neural network models to predict the trajectory of a target obstacle using learned semantic map features of the environment and learned dynamic history of the target obstacle according to one embodiment. The prediction module 303 of autonomous vehicle 101 may deploy the neural network models to operate on the target obstacle and the sub-map corresponding to the target obstacle provided by process 500 of FIG. 5 to perform process 600.

A CNN model 601 may process sub-map 530 in which vehicle 501 is the target vehicle at the reference position heading north to learn the semantic map features such as other vehicles, traffic elements, road features, etc., that vehicle 501 may encounter in sub-map 530. CNN model 601 may generate an output vector CNN out-feature 603 to represent the semantic map features of sub-map 530. In one embodiment, CNN out-feature 603 may be a 2048-element vector.

An embedding layer 607 or a fully connected NN layer may process the obstacle features 605 of the target vehicle such as the current position, heading, and other metadata (e.g., a speed, turning angle) of vehicle 501 to generate a low-dimensional vector 609 representing the features of vehicle 501 at the current time. The embedding layer 607 may be part of a RNN that contains an LSTM model 613. In one embodiment, the low-dimensional vector 609 may be a 64-element vector. LSTM model 613 may process the representation of the features of vehicle 501 at the current time from low-dimensional vector 609 and representation 611 of features of vehicle 501 from a previous time to learn the dynamic features of vehicle 501. In one embodiment, representation 611 of features of vehicle 501 from the previous time may be the state of LSTM model 613 at the last prediction cycle or planning cycle that represents the dynamic features of vehicle 501 learned from its past trajectory occurring prior to the current time. In one embodiment, representation 611 of features of vehicle from the previous time may be a 128-element vector. The output from LSTM 613 may be a high-dimensional vector 615 that represents the dynamic features of vehicle 501 up to the current time. In one embodiment, high-dimensional vector 615 may be a 128-element vector.

A fully connected NN layer such as MLP 617 may process the dynamic features of vehicle 501 up to the current time represented by high-dimensional vector 615 and the semantic map features of sub-map 530 represented by CNN out-feature 603 to predict the position of vehicle 501 at the first time point of the prediction interval. In one embodiment, the prediction interval may be 3 seconds that includes predicted positions for 30 time points spaced by a 0.1 second period. For example, MLP 617 may generate the predicted position 619 of vehicle 501 at the first prediction time point of 0.1 second based on the dynamic features of vehicle 501 up to the current time (e.g., time 0) represented by high-dimensional vector 615 and the semantic map features of sub-map 530 represented by CNN out-feature 603. In one embodiment, predicted position 619 of vehicle 501 at the first prediction time point may include the predicted position, direction, speed, turning angle and other metadata.

To generate the predicted position of vehicle 501 for the next time point, predicted position 619 at the first prediction time point may be processed through an embedding layer to generate a low-dimensional vector representing the features of vehicle 501 at the first prediction time point. In one embodiment, the embedding layer for the first prediction time point may be the same embedding layer 607 used to generate low-dimensional vector 609 representing the features of vehicle 501 at the current time. LSTM model 613 may process the low-dimensional vector representing the features of vehicle 501 at the first prediction time point to update the state of LSTM model 613, i.e., high-dimensional vector 615 that represents the dynamic features of vehicle 501 up to the current time. The updated output from LSTM 613 may be a high-dimensional vector 621 that represents the dynamic features of vehicle 501 up to the first prediction time point. MLP 617 may process the dynamic features of vehicle 501 up to the first prediction time point represented by high-dimensional vector 621 and the semantic map features of sub-map 530 to generate the predicted position 623 of vehicle 501 at the second time point of the prediction interval. In one embodiment, the semantic map features of sub-map 530 may be the same CNN out-feature 603 used by MLP 617 to generate the predicted position 619 at the first prediction time point.

To generate the predicted position of vehicle 501 for the other prediction time points of the prediction interval, process 600 may be repeated to process the latest prediction time point through embedding layer 607 to generate a low-dimensional vector representing the features of vehicle 501 at the latest prediction time point, process the low-dimensional vector representing the features of vehicle 501 at the latest prediction time point through LSTM model 613 to generate a high-dimensional vector that represents the dynamic features of vehicle 501 up to the latest prediction time point, and process the high-dimensional vector that represents the dynamic features of vehicle 501 up to the latest prediction time point and the semantic map features of sub-map 530 to generate the predicted position of vehicle 501 at the next time point of the prediction interval. Using a combination of LSTM model 613 to extract and learn the dynamic features of the target obstacle, CNN model 601 to extract and learn the semantic map features of the environment around the target obstacle, and MLP 617 to predict the positions of the target obstacle based on the dynamic features of the target obstacle and the semantic map features of the environment provides a more accurate, efficient, and robust prediction of the target obstacle's trajectory than using a rule-based method.

Figure 7:
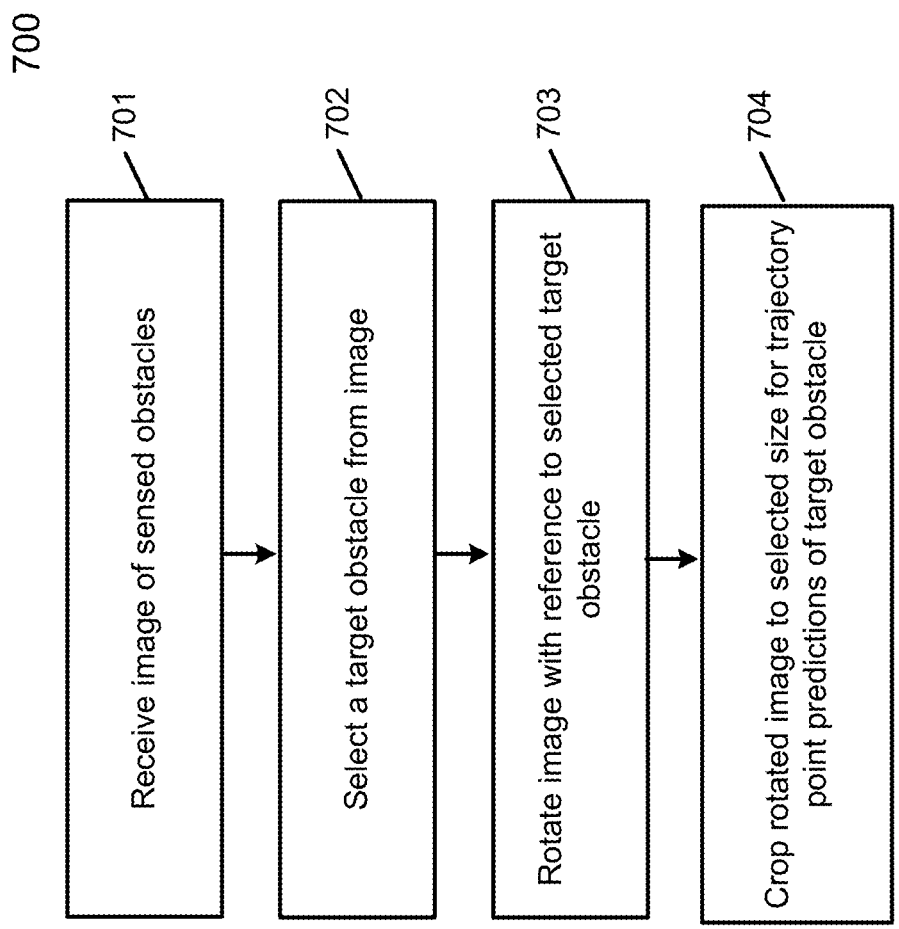
FIG. 7 is a flow diagram illustrating an example of a method for selecting a target obstacle and a sub-map from an image map for use in predicting the trajectory of the selected target obstacle in the selected sub-map according to one embodiment.

FIG. 7 is a flow diagram illustrating an example of a method 700 for selecting a target obstacle and a sub-map from an image map for use in predicting the trajectory of the selected target obstacle in the selected sub-map according to one embodiment. Method 700 may be performed by processing logic which may include software, hardware, or a combination thereof. For example, method 700 may be performed by the perception and planning system of an autonomous vehicle, such as perception module 302 or prediction module 303.

At operation 701, the method 700 receives an image map of sensed obstacles. The image map may be generated by perception module 302 or prediction module 303 from data captured by sensor system 115 of autonomous vehicle 101 to identify a sub-area of the image map around each selected obstacle to extract the semantic map features of the driving environment. In one embodiment, the image map may show the current positions, current headings, and past trajectories of other vehicles or pedestrians in the environment of autonomous vehicle 101.

At operation 703, the method 700 selects a target obstacle from the image map. The target obstacle may be one of the vehicles in the environment of autonomous vehicle 101 whose trajectory is to be predicted. In one embodiment, method 700 may cycle through all of the vehicles in the image map to select a vehicle as the target vehicle for every planning cycle.

At operation 703, the method 700 rotates the image map to position and orient the target obstacle at a reference position in a reference heading. In one embodiment, the reference position may be at near the center bottom of the rotated map image and the reference heading may be in a northerly direction within the rotated map image. In one embodiment, the reference position may be chosen relative to the sub-map that will be used to extract the semantic map features of the driving environment relevant to the target obstacle.

At operation 704, the method 700 crops the rotated image to a selected size with respect to the target obstacle at the reference position to generate the sub-map. Using the sub-map instead of the entire image map reduces the amount of semantic map features to be extracted for predicting the trajectory of the target obstacle. In one embodiment, the size of a sub-map may be large enough to envelope a predicted trajectory of the target obstacle for the duration of the prediction interval. For example, if the prediction interval is 3 seconds, the sub-map may be a 40 m×40 m square (400 pixels×400 pixels at a pixel spacing of 0.1 m) with the reference position for the target obstacle located at the mid-point in the x-axis and 10 m up in the y-axis of the sub-map. The sub-map may be used by a CNN model to extract and learn the semantic map features of the environment through which the target obstacle is expected to travel. The current position, heading, and other metadata (e.g., a speed, turning angle) of the target obstacle may be used by an LSTM model to extract and learn the dynamic feature of the target obstacle.

Figure 8:
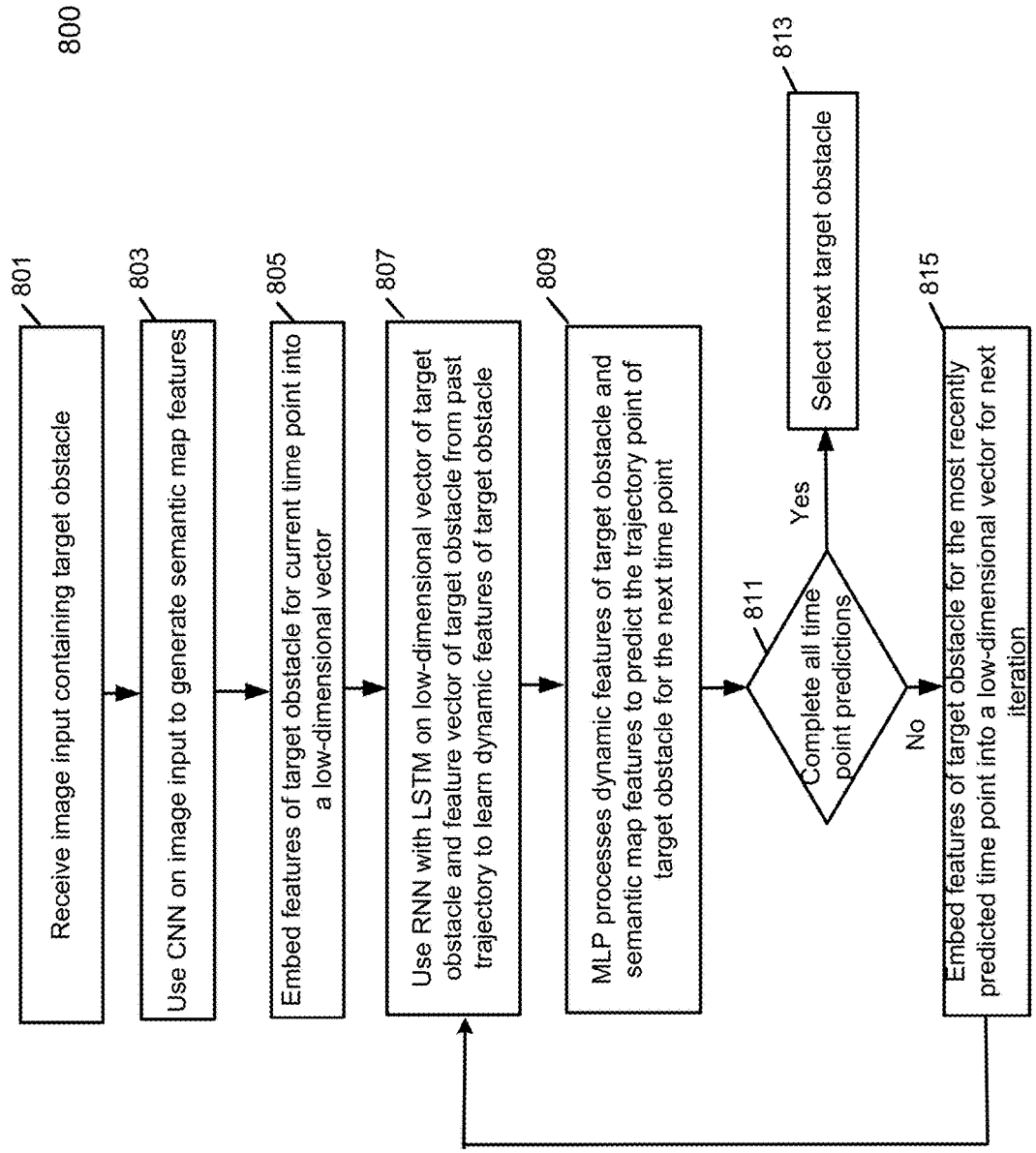
FIG. 8 is a flow diagram illustrating an example of a method for using neural networks to learn the dynamic history of the target obstacle and the semantic map features of the environment and to use the learned information of the target obstacle and the environment to predict the trajectory of the target obstacle according to one embodiment.

FIG. 8 is a flow diagram illustrating an example of a method 800 for using neural networks to learn the dynamic history of the target obstacle and the semantic map features of the environment and to use the learned information of the target obstacle and the environment to predict the trajectory of the target obstacle according to one embodiment. Method 800 may be performed by processing logic which may include software, hardware, or a combination thereof. For example, method 800 may be performed by the perception and planning system of an autonomous vehicle, such as prediction module 303.

At operation 801, the method 800 receives an image input containing a target obstacle. The target obstacle and the image input may be the selected vehicle and the sub-map surrounding the selected vehicle provided by the method 700 of FIG. 7. For example, the image input may contain the target obstacle at the reference position within the image input heading in a northerly direction.

At operation 803, the method 800 uses a CNN model to process the image input to learn the semantic map features such as other vehicles, traffic elements, road features, etc., that the target obstacle may encounter in the sub-map. The CNN model may generate an out-feature vector to represent the semantic map features of sub-map. In one embodiment, the out-feature vector may be a 2048-element vector. In one embodiment, operation 803 may use other types of NN models.

At operation 805, the method 800 uses an embedding layer to process obstacle features of the target obstacle such as the current position, heading, and other metadata (e.g., a speed, turning angle) of the target obstacle to generate a low-dimensional vector representing the features of the target obstacle at the current time. In one embodiment, the low-dimensional vector may be a 64-element vector. In one embodiment, operation 805 may use other types of fully-connected NN layer.

At operation 807, the method 800 uses a LSTM model to process the features of the target obstacle at the current time captured by the low-dimensional vector and dynamic features of the target obstacle from a previous time to update the dynamic features of the target obstacle. The output from the LSTM model may be a high-dimensional vector that represents the learned dynamic features of the target obstacle up to the current time. In one embodiment, the high-dimensional vector may be a 128-element vector. In one embodiment, the dynamic features of the target obstacle from the previous time may be the state of the LSTM model after the last prediction cycle or planning cycle, during which the LSTM model may learn the dynamic features of the target obstacle based its past trajectory occurring up to the last planning cycle. Thus, the dynamic features of the target obstacle from the previous time may also be a 128-element vector.

At operation 809, the method 800 uses a fully connected NN layer such as a MLP to process the dynamic features of the target obstacle up to the current time represented by the high-dimensional vector from the LSTM model and the semantic map features of the sub-map represented by the out-feature vector from the CNN model to predict the position of the target obstacle at the first time point of the prediction interval. In one embodiment, the prediction interval may be 3 seconds that includes predicted positions for 30 time points so that the first time point is at 0.1 second from the current time. In one embodiment, the predicted position of target obstacle at the first prediction time point may also include the predicted direction, speed, turning angle and other metadata.

At operation 811, the method 800 determines if the predicted positions of the target obstacle for all the time points of the prediction interval have been generated. If all the predicted positions of the prediction interval for the target obstacle have been generated, the method 800 selects the next target obstacle and the corresponding image input at operation 813. Process 800 is repeated to predict the positions of the next target obstacle for all the time points of the prediction interval until all the predicted positions of the prediction interval for every obstacle in the original image map have been generated.

At operation 815, if not all the predicted positions of the prediction interval for the target obstacle have been generated, the method 800 uses an embedding layer to process obstacle features of the target obstacle for the most recently predicted position to generate a low-dimensional vector representing the features of the target obstacle at the most recent time point of the prediction interval. In one embodiment, the embedding layer at operation 815 may be the same as the embedding layer at operation 805 used to generate the low-dimensional vector representing the features of the target obstacle at the current time.

The method 800 returns to operation 807 to iterate the LSTM model to process the features of the target obstacle at the most recent time point of the prediction interval captured by the low-dimensional vector to update the state of the LSTM model. In one embodiment, the dynamic features of the target obstacle from the previous time processed by the LSTM model to update the state of the LSTM model based on the features of the target obstacle at the most recent time point of the prediction interval may be the state of the LSTM model after the previous time point of the prediction interval. The updated state of the LSTM model may be an updated high-dimensional vector that represents the learned dynamic features of the target vehicle up to the most recent time point of the prediction interval. The method 800 iterates the MLP at operation 809 to process the dynamic features of the target obstacle up to the current time represented by the updated high-dimensional vector from the LSTM model and the semantic map features of the sub-map from the CNN model to predict the position of the target obstacle at the next time point of the prediction interval. In one embodiment, the same semantic map features of the sub-map from the CNN may be used by the MLP to generate the predicted positions for all the time points of the prediction interval. Operations 807, 809, and 815 may be repeated until the predicted positions of the target obstacle for all the time points of the prediction interval have been generated. The method 800 may be performed for every planning cycle. In one embodiment, the planning cycle is 0.1 second.

A data processing system may perform any of the processes or methods described above, such as, for example, the sub-map generation and target obstacle selection method, or the target obstacle trajectory prediction method. The data processing system can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

The data processing system may include one or more processors, one or more memories, and devices connected via a bus. Processors may represent one or more general-purpose processors such as a microprocessor, a central processing unit (CPU), or the like. More particularly, processors may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processors may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions. Processors may be configured to execute instructions stored in the memories for performing the operations and steps discussed herein.

Processing module/unit/logic, components and other features described herein can be implemented as discrete hardware components or integrated in the functionality of hardware components such as ASICS, FPGAs, DSPs or similar devices. In addition, processing module/unit/logic can be implemented as firmware or functional circuitry within hardware devices. Further, processing module/unit/logic can be implemented in any combination hardware devices and software components.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilising terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method to predict a trajectory of a target obstacle detected by an autonomous driving vehicles (ADV), the method comprising:
   in response to an image of a driving environment around the target obstacle, processing the image by a first neural network (NN) to learn semantic map features of the image;
   embedding features of the target obstacle into a low-dimensional vector;
   processing the low-dimensional vector and most recent dynamic features of the target obstacle by a second NN to learn updated dynamic features of the target obstacle;
   processing the updated dynamic features of the target obstacle and the semantic map features of the image by a third NN to generate a next predicted position of the target obstacle, the next predicted position including predicted features; and
   repeating embedding the predicted features of the next predicted position, processing by the second NN and processing by the third NN until all predicted positions of a prediction interval are generated.

2. The method of claim 1, wherein the features of the target obstacle in the image comprise one or more of a position, a heading, a speed, or a turning angle of the target obstacle.

3. The method of claim 1, wherein the semantic map features of the image comprise one or more of vehicles, traffic elements, or road features in the image.

4. The method of claim 1, wherein the most recent dynamic features of the target obstacle processed by the second NN to learn updated dynamic features of the target obstacle used to generate a first predicted position of the prediction interval comprises dynamic features of the target obstacle learned from a previous planning cycle of a plurality of planning cycles.

5. The method of claim 4, wherein all predicted positions of the prediction interval are generated to correspond to a plurality of periodic time points during the prediction interval for each of the plurality of planning cycles.

6. The method of claim 1, wherein the most recent dynamic features of the target obstacle processed by the second NN to learn updated dynamic features of the target obstacle used to generate a second or subsequent predicted position of the prediction interval comprises dynamic features of the target obstacle learned from a previous predicted position of the prediction interval.

7. The method of claim 1, wherein the first NN comprises a convolutional NN (CNN) model, the second NN comprises a long short-term memory (LSTM) model, and the third NN comprises a multi-layer perceptron (MLP).

8. The method of claim 1, wherein receiving an image containing the target obstacle comprises:
   receiving an image map of one or more sensed obstacles detected by the ADV for a planning cycle;
   selecting the target obstacle from the one or more sensed obstacles;
   rotating the image map to position the target obstacle at a reference point in a reference heading of the rotated image map; and
   cropping the rotated image map with respect to the target obstacle at the reference point in the reference heading to generate the image.

9. The method of claim 8, further comprising:
   selecting each of the one or more sensed obstacles as the target obstacle during the planning cycle.

10. A non-transitory machine-readable medium having instructions stored therein, which when executed by a processor, cause the processor to perform operations to predict a trajectory of a target obstacle detected by an autonomous driving vehicles (ADV), the operations comprising:
    in response to an image of a driving environment around the target obstacle, processing the image by a first neural network (NN) to learn semantic map features of the image;
    embedding features of the target obstacle into a low-dimensional vector;
    processing the low-dimensional vector and most recent dynamic features of the target obstacle by a second NN to learn updated dynamic features of the target obstacle;
    processing the updated dynamic features of the target obstacle and the semantic map features of the image by a third NN to generate a next predicted position of the target obstacle, the next predicted position including predicted features; and
    repeating embedding the predicted features of the next predicted position, processing by the second NN and processing by the third NN until all predicted positions of a prediction interval are generated.

11. The non-transitory machine-readable medium of claim 10, wherein the features of the target obstacle in the image comprise one or more of a position, a heading, a speed, or a turning angle of the target obstacle.

12. The non-transitory machine-readable medium of claim 10, wherein the semantic map features of the image comprise one or more of vehicles, traffic elements, or road features in the image.

13. The non-transitory machine-readable medium of claim 10, wherein the most recent dynamic features of the target obstacle processed by the second NN to learn updated dynamic features of the target obstacle used to generate a first predicted position of the prediction interval comprises dynamic features of the target obstacle learned from a previous planning cycle of a plurality of planning cycles.

14. The non-transitory machine-readable medium of claim 10, wherein the most recent dynamic features of the target obstacle processed by the second NN to learn updated dynamic features of the target obstacle used to generate a second or subsequent predicted position of the prediction interval comprises dynamic features of the target obstacle learned from a previous predicted position of the prediction interval.

15. The non-transitory machine-readable medium of claim 10, wherein the first NN comprises a convolutional NN (CNN) model, the second NN comprises a long short-term memory (LSTM) model, and the third NN comprises a multi-layer perceptron (MLP).

16. The non-transitory machine-readable medium of claim 10, wherein the operations further comprise:
receiving an image map of one or more sensed obstacles detected by the ADV for a planning cycle;
selecting the target obstacle from the one or more sensed obstacles;
rotating the image map to position the target obstacle at a reference point in a reference heading of the rotated image map; and
cropping the rotated image map with respect to the target obstacle at the reference point in the reference heading to generate the image.

17. A data processing system, comprising:
a processor; and
a memory coupled to the processor to store instructions, which when executed by the processor, cause the processor to perform operations of predicting a trajectory of a target obstacle detected by an autonomous driving vehicles (ADV), the operations comprising:
in response to an image of a driving environment around the target obstacle, processing the image by a first neural network (NN) to learn semantic map features of the image,
embedding features of the target obstacle into a low-dimensional vector;
processing the low-dimensional vector and most recent dynamic features of the target obstacle by a second NN to learn updated dynamic features of the target obstacle,
processing the updated dynamic features of the target obstacle and the semantic map features of the image by a third NN to generate a next predicted position of the target obstacle, the next predicted position including predicted features, and
repeating embedding the predicted features of the next predicted position, processing by the second NN and processing by the third NN until all predicted positions of a prediction interval are generated.

18. The data processing system of claim 17, wherein the most recent dynamic features of the target obstacle processed by the second NN to learn updated dynamic features of the target obstacle used to generate a first predicted position of the prediction interval comprises dynamic features of the target obstacle learned from a previous planning cycle of a plurality of planning cycles.

19. The data processing system of claim 17, wherein the first NN comprises a convolutional NN (CNN) model, the second NN comprises a long short-term memory (LSTM) model, and the third NN comprises a multi-layer perceptron (MLP).

20. The data processing system of claim 17, wherein the operations further comprise:
receiving an image map of one or more sensed obstacles detected by the ADV for a planning cycle;
selecting the target obstacle from the one or more sensed obstacles;
rotating the image map to position the target obstacle at a reference point in a reference heading of a rotated image map; and
cropping the rotated image map with respect to the target obstacle at the reference point in the reference heading to generate the image.

* * * * *